US012618278B2

(12) United States Patent
Bachschneider et al.

(10) Patent No.: US 12,618,278 B2
(45) Date of Patent: May 5, 2026

(54) METHOD FOR DETECTING A PINCHING SITUATION WHEN MOVING A MOVABLE COMPONENT

(71) Applicant: Webasto SE, Stockdorf (DE)

(72) Inventors: Verena Bachschneider, Stockdorf (DE); Julian T. Dittrich, Stockdorf (DE); Lorenz Casper, Stockdorf (DE)

(73) Assignee: Webasto SE, Stockdorf (DE)

( * ) Notice: Subject to any disclaimer, the term of this patent is extended or adjusted under 35 U.S.C. 154(b) by 171 days.

(21) Appl. No.: 18/660,888

(22) Filed: May 10, 2024

(65) Prior Publication Data

US 2024/0376763 A1 Nov. 14, 2024

(30) Foreign Application Priority Data

May 11, 2023 (DE) ........................ 102023204396.3

(51) Int. Cl.
*E05F 15/41* (2015.01)

(52) U.S. Cl.
CPC ......... *E05F 15/41* (2015.01); *E05Y 2900/542* (2013.01)

(58) Field of Classification Search
CPC ........................... E05F 15/41; E05Y 2900/542
See application file for complete search history.

(56) References Cited

U.S. PATENT DOCUMENTS

| | | | | |
|---|---|---|---|---|
| 6,274,947 | B1 * | 8/2001 | Terashima | H02H 7/0851 318/266 |
| 2009/0295556 | A1 * | 12/2009 | Inoue | E05F 15/695 49/506 |
| 2017/0081894 | A1 * | 3/2017 | Kobayashi | E05F 15/659 |
| 2020/0031207 | A1 * | 1/2020 | Henes | E05F 15/41 |
| 2021/0178871 | A1 * | 6/2021 | Craane | E05F 15/662 |
| 2022/0154510 | A1 * | 5/2022 | Romaszko | E05F 15/41 |
| 2022/0154511 | A1 * | 5/2022 | Romaszko | E05F 15/40 |
| 2022/0205300 | A1 * | 6/2022 | Masuzawa | E05F 15/695 |
| 2024/0174061 | A1 * | 5/2024 | van Mourik | E05F 15/41 |

(Continued)

FOREIGN PATENT DOCUMENTS

| | | |
|---|---|---|
| DE | 102009019015 | 11/2010 |
| DE | 102009035449 | 2/2011 |
| DE | 102010037804 A1 | 3/2012 |

(Continued)

*Primary Examiner* — Minnah L Seoh
(74) *Attorney, Agent, or Firm* — Command IP LLP; Michael Zarrabian

(57) ABSTRACT

A method for detecting a pinching situation when moving an adjustable component for closing an opening by means of an electric motor in a vehicle comprises the following steps: providing a trigger threshold for a closing force exerted by the electric motor on the component or a physical variable on which it is based, with which the electric motor is operated, for at least one movement position of the component within a travel path available to it for the movement; moving the component into the movement position; determining a current value of the closing force or of the physical variable on which it is based for the at least one movement position; comparing the current value and the trigger threshold; and outputting a trigger signal which indicates the pinching situation dependent from the result of the comparison.

11 Claims, 3 Drawing Sheets

(56) References Cited

U.S. PATENT DOCUMENTS

2024/0279976 A1* 8/2024 Beuschel .............. E05F 15/695

FOREIGN PATENT DOCUMENTS

| | | | | | |
|---|---|---|---|---|---|
| DE | 102014221246 | | | 4/2016 | |
| DE | 102016211054 | A1 | | 12/2017 | |
| DE | 102017218428 | B3 | * | 1/2019 | ............. E05B 81/21 |
| DE | 102021208896 | A1 | | 10/2022 | |
| DE | 102023208561 | B3 | * | 9/2024 | |
| EP | 2204891 | B1 | * | 8/2019 | ........... H02H 7/0851 |
| EP | 4001565 | A1 | | 5/2022 | |
| JP | 2018003426 | A | * | 1/2018 | .............. E05F 15/41 |
| JP | 2018105026 | A | * | 7/2018 | |
| WO | WO-2009000823 | A1 | * | 12/2008 | .............. E05F 15/41 |
| WO | WO-2017198421 | A1 | * | 11/2017 | .............. E05F 15/41 |
| WO | WO-2020261665 | A1 | * | 12/2020 | .............. E05F 15/41 |

* cited by examiner

METHOD FOR DETECTING A PINCHING SITUATION WHEN MOVING A MOVABLE COMPONENT

CROSS-REFERENCE TO RELATED APPLICATION

This application claims priority to German Application No. DE 10 2023 204 396.3 filed on May 11, 2023, which is incorporated herein by reference in its entirety for all purposes.

TECHNICAL FIELD

Various aspects relate to a method for detecting a pinching situation when moving a movable component for closing an opening by means of an electric motor in a vehicle. Further aspects thus relate to a corresponding device.

TECHNICAL BACKGROUND

Motor vehicles regularly include windows or sliding or sunroofs as electrically driven components that are adjustable in order to close or open the corresponding window or roof openings. More recently, the same has thus been true for tailgates or sliding doors as electrically adjustable components. As this may lead to accidents in the sense that body parts such as arms, hands, fingers, legs or a head can be undesirably trapped between the respective component and at the edge of the opening in question, technical standards have been created in many countries that require the vehicle manufacturer to implement anti-trapping or anti-pinching protection measures. In particular, anti-pinching protection must be set up in a manner that the body part in question is detected as a pinched object during a respective closing movement.

This type of detection is usually carried out by monitoring a force applied to close the opening or to move the component, or a corresponding quantity during the closing process. In the case of electric window regulators or sunroof motors, many of the technical standards mentioned require a value of 100 N as a limit for the maximum force (i.e. clamping force) that can be applied to an object or part of the body without causing injury etc. In practice, therefore, a triggering threshold that is often well below this limit value is usually applied to ensure reliable detection and that the limit value is not exceeded. If a force exerted on the component during the closing process exceeds this trigger threshold, it can be concluded that an object is present on the remaining section of the component's travel path to close the opening. It should also be noted that the closing force is made up of the force exerted on the component during the closing process as well as friction and deformation forces generally acting against it and, where applicable, wind and roof loads, etc. The closing force is therefore generally larger than the force exerted on the component during the closing process, i.e., the clamping force.

For example, an electric control may often provide for control of the drive in such a way that the component maintains a constant speed or motor speed, for example, or at least a correspondingly specified profile during the closing process (motor speed control as an example). If, for example, a mechanical resistance increases due to friction on a section of the travel path of the component that is to be passed, the relevant motor control unit may, for example, readjust the voltage or power supply of the electric motor in order to overcome the resistance by increasing the closing force with the aim of maintaining the specified speed. In this respect, there are regular fluctuations in the closing force over the travel path of the component that is to be passed. Such fluctuations, which are not related to actually trapped objects, are usually taught in the system and generally do not pose a problem. The motor speed may be determined, for example, with the help of position sensors, in particular Hall sensors, or by measuring a voltage curve, etc.

Even with motors which are not speed-controlled, a closing force or the corresponding clamping force may be inferred by determining a motor speed, for example.

Detection is therefore based on the monitoring of a physical quantity that reflects the curve of the motor torque over the current position of the movable component (e.g., the roof system), that is closing force over travel path, and a comparison of this quantity with a stored reference curve, that is closing force over travel path. As soon as the currently determined physical quantity exceeds the stored reference value by more than a definable trigger threshold, the system detects a pinching entity and triggers a reversing movement. This means that the closing process is stopped immediately and the component is moved back a few centimeters to at least partially release the opening so that the object or body part can be pulled out unharmed.

In general, the closing force itself is not determined by sensors to detect a pinching situation, but is calculated using physical quantities associated with the operation of the electric motor. For example, the force exerted by the motor depends linearly on the voltage with which the motor is supplied, e.g. via PWM control (PWM: pulse width modulation), and/or the rotational or angular speed at which the rotor rotates. The closing force can be calculated from this using other known, fixed variables such as the transmission ratio, etc. Alternatively, it is also possible, for example, to measure the motor voltage directly and compare it with a threshold value of the motor voltage corresponding to the trigger threshold in order to detect the pinching situation.

Due to ageing processes, in particular of the underlying mechanics (lubrication, friction on seals that wear out over time and become rougher on the surface or dirty, etc.) or with regard to heating of the motor, changes may occur in the corresponding profiles of the closing force (or the physical quantity representing this, see above) over the travel path to be passed. If such effects have an excessive impact and, as a result, there is a real stiffness at certain movement positions over the travel path, a so-called faulty reversal may be the consequence if a corresponding trigger threshold is exceeded. In this case too, the closing process is stopped when this event is detected and the movable component may then be opened slightly in order to be able to pull an object out of the clamping area—but without there actually being an object in it. Such a faulty reversal is of course undesirable and, in extreme cases, may result in a window or roof no longer being able to close, even though the available motor power would be completely sufficient.

Documents EP 4 001 565 A1 and US 2022/154511 A1 therefore propose dynamically adapting the trigger threshold. During the previous opening process, a complete (opening) force profile is recorded over the travel range of the component and, at the beginning of the (later) closing movement, a reference value for the closing force is measured at a first movement position and compared with the corresponding value of the opening force at the same position during the previous opening process. The difference is determined and multiplied by a factor, resulting in a value for the displacement by which the (opening) force profile determined first is displaced to higher values and beyond the expected closing force profile. This dynamically determined displaced force profile now serves as a suitable trigger threshold.

However, this procedure has a disadvantage that any sluggishness detected during the opening process does not necessarily appear to be reflected in an analogous manner during the opposite closing process. Furthermore, a time period can also have elapsed between the opening process and the closing process, which time period the does not take into account, for example, the heating or cooling of the motor, etc. Furthermore, the proposed method appears to be based on the assumption that increases in closing force that are already present during the opening process can in principle be tolerated and are thereby also taken along in an analogous manner during the closing process, unless further measures are taken.

Document DE 10 2009 019 015 A1 proposes dynamically adapting a conventionally constant reference value, which here too serves as a starting point for a trigger threshold that is higher in terms of absolute value, in order to take into account increases in force on the path region positioned in the closing direction.

Document DE 10 2010 037 804 A1 discloses that the trigger threshold is raised at a specific time, specifically when a starting process of the motor vehicle is detected.

A dynamically adapted trigger threshold can therefore nevertheless be used to anticipate specific expected changes in sluggishness.

There is nevertheless still a need to further improve the detection of a pinching situation in order to avoid pinching. There is also the need for a corresponding device.

SUMMARY OF THE INVENTION

Aspects of the invention that take this need into account relate to methods for detecting a pinching situation when moving an adjustable component for closing an opening by means of an electric motor in a vehicle, which method comprises the following steps according to the preamble of the appended claim 1:

Providing a trigger threshold for a closing force exerted by the electric motor on the component or a physical variable on which it is based, with which the electric motor is operated, for at least one movement position of the component within at least a section of the travel path available to it for the movement; moving the component into the movement position; determining a current value of the closing force or the physical variable on which it is based for the at least one movement position; comparing the current value and the trigger threshold; and outputting a trigger signal indicating the pinching situation depending on the result of the comparison.

In this case, the adjustable component can be, in particular, a sliding roof element, a glass or sunroof, a glass window, a sliding door, a rear flap or side flap, a top, a displaceable hard top, etc. The opening denotes the appropriate recess provided in the frame of the vehicle that can be closed by the component. The electric motor can be any desired controllable electric motor, but in particular a DC motor, preferably a brushless (BLDC) DC motor.

The method steps described reflect a suitable, substantially conventional detection of a pinching situation. The sequence of the steps is interchangeable insofar as the causality of the sequence of the detection is not affected. The trigger threshold can be specified in any desired manner. Initially, only the detection of a pinching situation for at least a single current movement position of the component on its closing path and therefore the specification of the trigger threshold initially also only for this movement position are considered here. The repetition of the steps for a plurality of successively reached movement positions, ideally almost continuously, is preferred in order to enable continuous monitoring during closing.

The trigger threshold here denotes a threshold value for a closing force exerted by the electric motor on the component or for a physical variable on which the closing force is based, with which the electric motor is operated. As described above, the trigger threshold can be, in particular, a value, corresponding to the closing force, of the voltage applied to the motor (for example a PWM-controlled value, optionally also smoothed by inductances, etc.), and/or a rotational or angular speed of the motor. The trigger threshold can be assigned to a threshold value for the clamping force ultimately exerted by the movable component specifically on a pinched object.

The trigger threshold can be taken for example for the specific movement position of the component from a table stored for example in a memory and be read in. The values for the trigger threshold can be learned for this purpose in previous opening and/or closing processes. Alternatively or additionally, it can also—in a manner similar to that described above—be determined dynamically from the current closing process or a previous release process of the opening (i.e. during a release of the opening carried out last). In this case, the value is calculated for example in microcontrollers.

However, it is also possible for a single value of the trigger threshold, which is valid for all movement positions, to be specified for example once, in the event that the steps are repeated for a plurality of movement positions, as mentioned above.

This may apply to a case in which it is accepted in a simplified manner that the closing force required for the closing path increases, but the only one specified trigger threshold is nevertheless in principle sufficient to ensure reliable detection of the pinching situation over the entire travel path for the component, with exceptions being made in the further embodiment, if appropriate, by the steps which are still to be described below and which characterize the proposed method.

Furthermore, the case of only one trigger threshold may also include normalization: in this case, the current value of the closing force or of the physical variable corresponding thereto for each movement position (if the method according to the invention is repeated for many successive movement positions) is related to the value corresponding to the trigger threshold as a fixed variable in this case. The current value of the closing force or of the physical variable corresponding thereto may in this case be represented in a dimensionless unit, for example a percentage. The invention is not restricted to a specific dimension or unit of the predefined, monitored and/or adapted variables. It is essential that there is a reference to the absolute clamping force which should not exceed a predetermined threshold value.

The movement of the component into the movement position may include the operation or the control of the electric motor. The at least one movement position may be tracked or determined by a position sensor, for example by a Hall sensor, and/or by counting the motor rotation or by counting, for example, PWM pulses in the motor control.

If the component has reached the at least one considered movement position during the closing process, a current value of the closing force or of the physical variable on which it is based is determined for this movement position.

For this purpose, for example, as mentioned, the voltage applied to the motor can be measured or the rotational or angular speed can be determined. Corresponding sensors may be set up for this purpose. The closing force may thus be calculated indirectly from these variables. It is not ruled out that the closing force is determined in another way or even measured directly.

The steps of comparing the current value and the trigger threshold and of outputting a trigger signal indicating the pinching situation depending on the result of the comparison enable the actual detection of the pinching situation and the initiation of such measures which eliminate the pinching situation, for example the reversal described above.

Aspects and exemplary embodiments of the invention are based on the sequence of the method described so far: the invention is based on investigations which were made by the inventors with regard to frequent cases of faulty reversal. In this case, it was found that a relevant contribution to cases of faulty reversal (i.e. the erroneous recognition of pinched objects) stems from how long the relevant component (here using the example of a glass, sunroof or sliding roof) was already open. The background is that seals at or near the opening, which are in close contact with the component in the closed state, in order to seal or at least protect the vehicle interior with respect to the outside, in particular with respect to water, dirt and wind, can be elastically compressed, i.e. deformed, in this state in a considerable manner. In the case of relief by release of the opening by the adjustable component, these seals may, depending on the material, deform back into their original, unloaded form or expand out of compression again. In most cases, these seals in the opening region include a profile or cross sectional shape completely or partially enclosing an inner space (air inclusion in the hose-like profile or round cross section).

By compression in the closed state of the component, this profile is compressed, so that, for example, the air in the interior escapes. In the case of relief, the seal slowly takes up its original profile again in an elastic manner during production and expands in the direction of the now adjusted component. As has been found, this process takes several minutes up to one hour or more. The temperature may thus play a role hereby. If the component is adjusted again after such a period of time in order to close the opening, a comparatively stronger force has to be applied in order to carry out the compression again than in the case of a component which has only recently been opened. In other words, it has been found that the opening time may play a significant role and that cases of faulty reversal may occur if, during closing, the component contacts the seals after a longer opening time.

In a first step for a corresponding compensation, a period of time is therefore determined over which the component was held in this or other movement positions up to a point in time of the movement of the component into the at least one movement position in which the opening was continuously not closed by the adjustable component. In other words, a duration or period of time is determined in which the component was hitherto in anopend state. Intermediate movement of the component while the component is still open is harmless since the seals are not affected thereby.

In a second step, the predefined triggering threshold is then adapted, in particular increased, depending on the determined duration or period of time. Or additionally or alternatively, the determined current value of the closing force or of the physical variable on which it is based is adapted, in particular decreased, depending on the determined duration or period of time relative to the predefined triggering threshold. The second case relates in particular to the above-mentioned case in which the triggering threshold is kept constant overall for the path region and instead the current value of the closing force or of the physical variable is normalized to a predefined reference value.

The extent of the adaptation is carried out in such a way that the effect of an increased closing force is at least partially compensated for, which is necessary during the operation of the electric motor if, over time, at least one seal to be pressed by the component is expanded elastically into a shape free of loads on account of the preceding opening of the component.

An at least partial compensation is already sufficient to avoid most cases of faulty reversal.

In a third step, according to this aspect, the adapted triggering threshold, or in the case of the mentioned normalization to the triggering threshold, the adapted current value of the closing force (normalized relative to the triggering threshold) or of the physical variable (normalized relative to the triggering threshold) is used in the above-mentioned step of comparing instead of the measured current value or the predefined triggering threshold, which finally leads, depending on the result, to the output of a trigger signal with which a relief from the pinching situation can be initiated.

As a result, the detection of a pinching situation is improved overall by this aspect, and cases of faulty reversal are reduced or even avoided almost completely. The influence of opening times of the component on the reliable detection of the pinching situation is minimized at the same time. The method steps can be carried out in a simple manner by existing system components such as an electronic control unit (ECU) for the control of the relevant component.

The opening times can be calculated for example by simply querying a system time or a time stamp from a central control module of the vehicle for the previous opening time and the current closing time via a vehicle bus. In the case of a longer opening time, the system time or the time stamp for the previous opening time can be stored in a coordinated manner in a memory and stored there for the case of later closing, which probably occurs reliably. If the vehicle with the component being in an opened state is in the switched-off operating state for a longer time, it is advantageous to use a non-volatile memory.

According to a specific embodiment of the aspect, the method comprises the mentioned step of reversing the component depending on the trigger signal.

Likewise, according to an already mentioned specific embodiment, the step of determining the time duration comprises the following steps: querying a first time stamp, at which the component is moved out of a completely closed position or a position in which an elastic material, for example a seal, is at least partially deformed or compressed by operation of the electric motor; querying a second time stamp, at which the component reaches or begins to reach the at least one movement position by operation of the electric motor during the current closing; calculating the time duration from the first time stamp and the second time stamp. By the phrase “begins to reach” it is meant for example the start of a compact or continuous movement process, which lasts until the considered movement position is reached. Thus, a query does not need to be started for each coordinate along the travel path, but rather, for example, the event of the start of a movement may be a trigger for a query of the second time stamp. If there is an intermediate stop, after a new start of a movement, for example, a second time stamp is queried again.

A further embodiment provides that, if a first period of time or duration is determined, a first adaptation of the trigger threshold or of the current value of the closing force or of the physical variable on which it is based is carried out, which leads to a first difference with respect to the originally predefined triggering threshold, and if a second period of time or duration is determined, which is greater or lasts longer than the first period of time or duration, a second adaptation of the triggering threshold or of the current value is carried out, which leads to a second difference with respect to the originally predefined trigger threshold, wherein the second difference is greater than the first difference. In other words, the determination of a longer period of time, or duration, for the opened state of the component leads to a stronger adaptation of the trigger threshold. The same applies analogously to the case in which the current value of the closing force is adapted instead of the trigger threshold.

It should be noted that more than only two steps (corresponding to the two differences mentioned) are also possible, e.g. 3, 4, 5, . . . or more steps, or that a linearly or nonlinearly increasing profile of the differences can take place depending on the period of time, or duration, in the adaptation of the trigger threshold.

A further improvement of this aspect of the method may provide that within the overall travel path available to the component for the movement a predetermined section of travel path is defined, which corresponds to an interval of possible movement positions of the component, in which the component in the load-free state of the at least one seal may come into contact with it; and the adaptation of the trigger threshold or of the current value is further carried out depending on whether the at least one movement position of the component lies within the predetermined section of travel path. This step consequently provides a restriction of the application of the steps characterizing this aspect for a compensation accounting for a duration of an opened state only to specific sections of the travel path of the component on its closing path. If, for example, a movement position is present in which the component cannot come into contact with the seal at all, then no additional force to be applied for the pressing is to be expected there. With the simple position check indicated above, the steps of determining the duration of the opened state and of the adaptation then do not need to be carried out for all non-relevant movement positions. In the case of a plurality of seals or different or different contact situations, a plurality of separated and spaced-apart travel paths can also be present or defined with respect to the closing path, which serve as a basis for the check.

It should be noted here that, according to exemplary embodiments, a determination of the opened state duration does not need to be carried out individually each time for movement positions of a travel path. Rather, according to these exemplary embodiments, this step only needs to be carried out once for all movement positions of the respective travel path. With regard to the step of adapting the trigger threshold and the current value of the closing force or physical variable related to the trigger threshold, only a single compensation value which is uniform for the travel path then also needs to be determined, by which the individually determined (measured) current value is adapted. However, since these values can in principle be different, this adaptation by the same uniform compensation value then still needs to be carried out individually for each movement position.

According to an embodiment already indicated above, at least one of the steps of predefining a trigger threshold, of determining the current value, of adapting the trigger threshold or the current value and of comparing the current value with the trigger threshold can be repeated for a multiplicity of movement positions along a travel path within the travel path. Continuous monitoring of the travel path during the closing process is thus made possible.

According to a further embodiment, the adaptation of the trigger threshold or of the current value is calculated using a formula proceeding from the predefined trigger threshold or from the determined current value and a term to be added with a linear dependence on the determined time duration. This term forms, for example, the compensation term already addressed above, which is calculated uniformly for a defined travel path.

The aspects of the invention can be applied particularly advantageously, for example, to an opening provided in the vehicle, in which two or even three seals, namely a circumferential acoustic seal, a circumferential seal for the water and dirt repellency and a seal sealing a gap between adjacent roof components are provided.

Aspects of the invention also relate to a device for detecting a pinching situation when moving an adjustable component for closing an opening by means of an electric motor in a vehicle, comprising:

first module unit, which is configured to operate the electric motor, to detect a pinching situation in the process and to control the electric motor as a function of the detection in order to reverse the component, wherein the first module unit is further configured:

to receive a trigger threshold for a closing force exerted by the electric motor on the component or a physical variable on which it is based, with which the electric motor is operated, for at least one movement position of the component within a travel path available to it for the movement;

to move the component into the movement position by operating the electric motor;

to obtain a current value of the closing force or of the physical variable on which it is based for the at least one movement position;

to compare the current value and the trigger threshold; and to output a trigger signal which indicates the pinching situation dependent from the result of the comparison and with which, in particular, the closing operation of the component is switched to its reversing operation;

second module unit, which is configured:

to read in a trigger threshold and/or a current value of the closing force or of the physical variable on which it is based for the at least one movement position;

to determine a time period over which the component was held in other movement positions up to a point in time of the movement of the component into the movement position, in which the opening was continuously not closed by the adjustable component;

to adapt, in particular to increase, the read-in, predefined trigger threshold dependent from the determined time period, or to adapt, in particular to decrease, the read-in, current value dependent from the determined time period relative to the read-in trigger threshold, in order to compensate for the effect of an increased closing force which becomes necessary during the operation of the electric motor if, over time, at least one seal to be pressed by the component is elastically expanded into a shape in which it is unloaded due to the preceding opening of the component; and to transmit the adapted trigger threshold or the adapted current value to the first module unit.

The same advantages result as described above.

Further advantages, features and details of the various aspects result from the claims, the following description of preferred embodiments and with reference to the drawings. In the figures, the same reference signs denote the same features and functions.

BRIEF DESCRIPTION OF THE DRAWINGS

There is shown in.

PREFERRED EMBODIMENT(S) OF THE INVENTION

In the following description of a preferred exemplary embodiment, it should be taken into consideration that the present disclosure of the various aspects is not restricted to the details of the construction and the arrangement of the components, as they are shown in the following description and in the figures. All exemplary embodiments, even those not shown in the figures, can be put into practice or carried out in various ways. It should furthermore be taken into consideration that the expression and terminology used here is only used for the purpose of the specific description and these should not be interpreted by the person skilled in the art as such in a restrictive manner. Furthermore, in the following description, the same reference signs denote the same or similar features or objects in the figures, with the result that, in some cases, a repeated detailed description thereof is dispensed with in order to preserve the compactness and clarity of the illustration.

Figure 1:
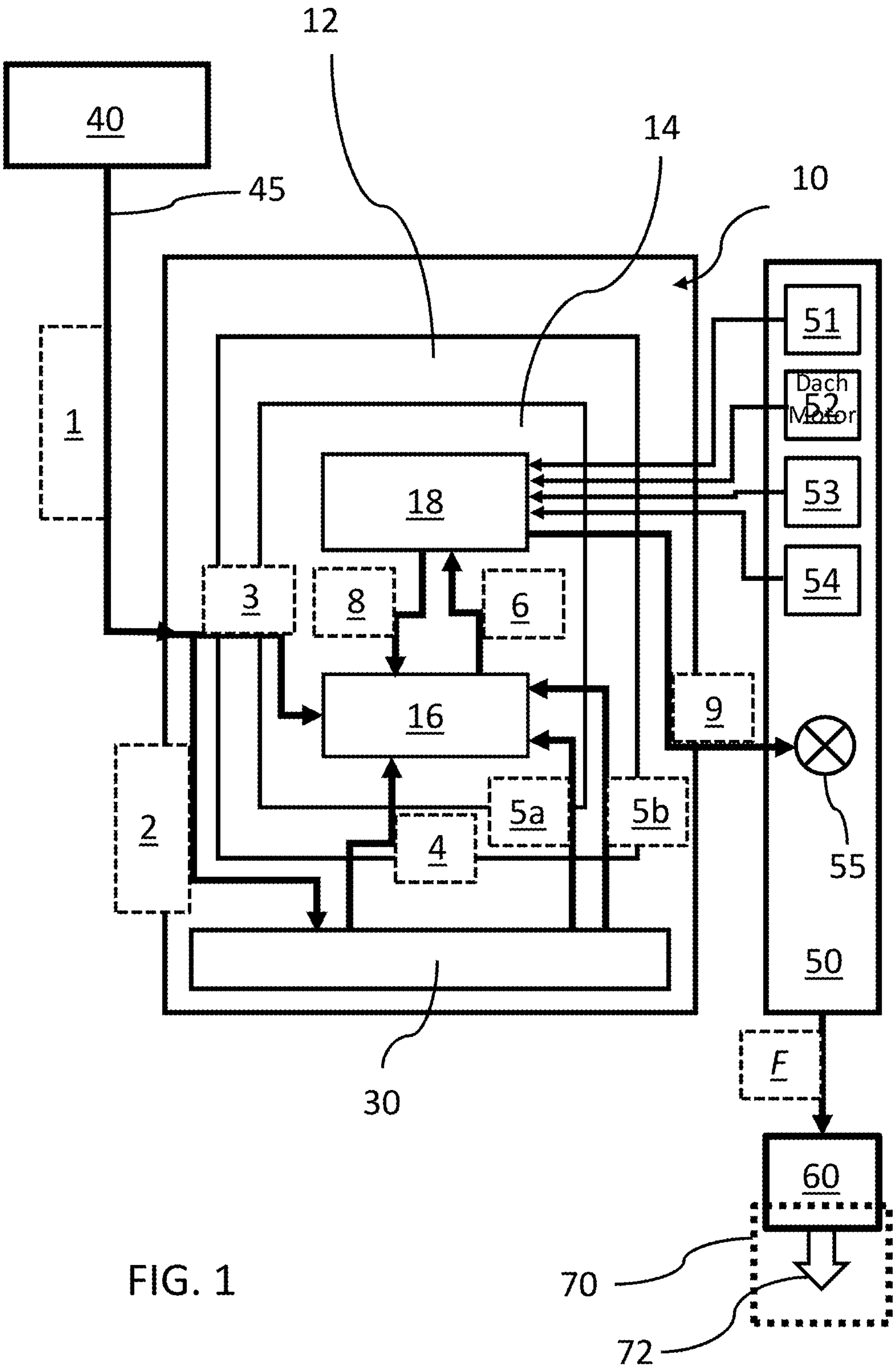
FIG. 1 an overview of a device for detecting a pinching situation according to an exemplary embodiment of the invention.

FIG. 1 shows an overview of a device 1 for detecting a pinching situation according to an exemplary embodiment of the invention. The device 1 comprises an electronic control unit 10 (ECU) and a motor unit 50 having an electric motor 55 which is operated by the electronic control unit 10. For this purpose, the electronic control unit 10 in FIG. 1 has a circuit (not shown) which comprises, for example, electric switches (e.g. power transistors) in a known manner, which make it possible to operate or control the motor in pulse width modulation (PWM). The electric motor 55 may be a BLDC motor. In this case, the motor is supplied with a voltage from a vehicle battery (not shown) and the power of the motor is determined via the pulse widths defined by driving the power transistors. This driving is performed by a microcontroller, which is, inter alia, in this regard configured with a software application 12.

The electronic control unit 10 is further connected to a central control module 40 (e.g. BCM) via a vehicle bus 45, for example a CAN bus or a LIN bus, etc. As is yet to be explained, this serves in the present case only to provide a system time.

The software application 12 comprises, inter alia, a pinch protection module 14. The pinch protection module 14 is responsible for controlling the power transistors, with which the electric motor 55 is in turn operated. The pinch protection module 14 comprises two module units, namely a first module unit 16, which controls the actual operation for moving the component 60 driven by the electric motor 55 and, during this, performs a pinch detection, and a second module unit 18, which performs a calculation of a compensation accounting for a duration of an opened state and transmits the result to the first module unit 16 so that the latter performs its monitoring with adapted values.

Figure 2:
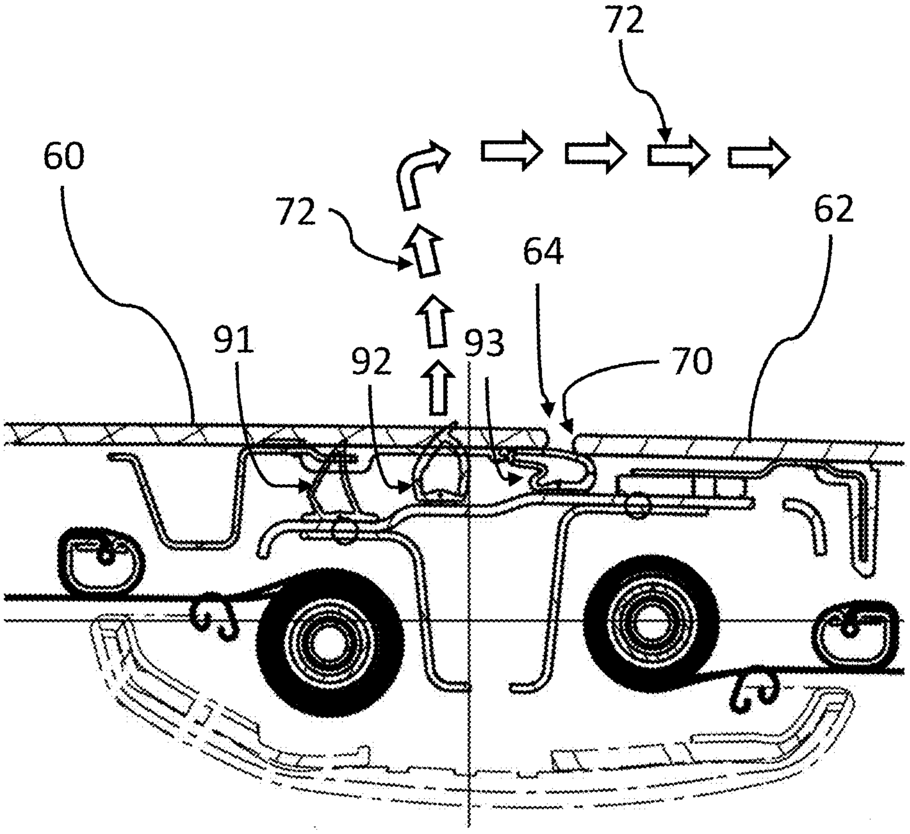
FIG. 2 a cross-sectional view of a detail with an adjustable component (glass roof) resting on three seals in an opening.

According to the exemplary embodiment shown in FIG. 1, the operation is as follows:

At a point in time $t_1$, a passenger or the driver of the vehicle actuates an operating module (not shown) in order to move the component 60 (reference sign 72), so that the latter releases an opening 70 of the vehicle. For example, such opening 70 may be related to a glass roof as shown in FIG. 2 as the adjustable component 60. This is signaled to the electronic control unit 10 via the central control module 40 and the vehicle bus 45 (box 1). The first module unit 6 then operates the electric motor 55 in order to move the component 60, so that the roof is opened. At the same time, the second module unit 18 initiates a query to the central control unit 40 via the vehicle bus with a request for a system time. The central control unit 40 responds with a time stamp containing the then current system time (box 2), which is stored in the memory 30. In the exemplary embodiment, memory 30 may be a non-volatile memory, or at least for this time stamp a non-volatile partial area of the memory 30 optionally additionally comprising a RAM (random-access memory).

At a second point in time $t_2$, the operating module is actuated again in order to close the roof. The information is transmitted to the electronic control unit 10 in an analogous manner via the central control module 40 and the vehicle bus 45. The software application or the first module unit 16 of the pinch protection module 14 then sets the component into a movement 72 for closing the opening by operating the electric motor 55.

Figure 3:
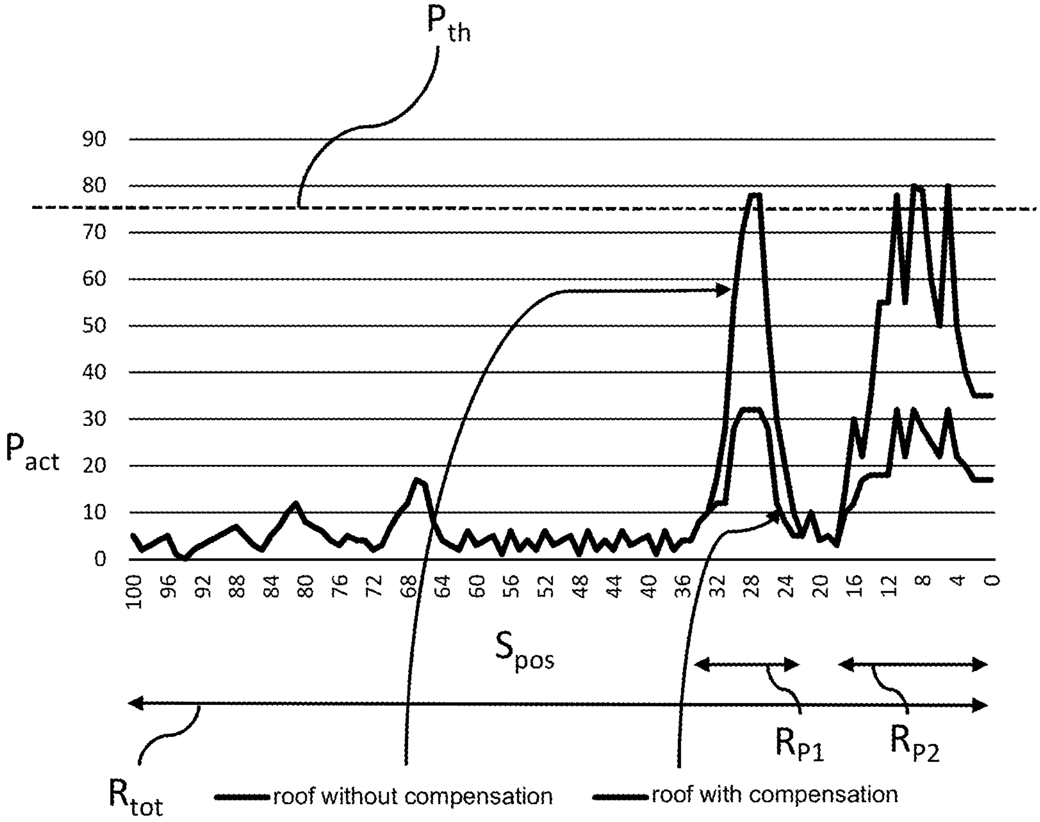
FIG. 3: a comparison of the currently determined closing force (Pact) plotted over the travel path ($R_{tot}$) of the component during closing of the opening for the conventional case without compensation for a longer opened state duration of the component and the case according to the invention with compensation for a longer opened state duration of the component within defined travel paths RP1 and RP2, in which the component may contact and press the seals shown in FIG. 2. A case of a longer opened state duration of the component is assumed in FIG. 3.

In order to detect a pinching situation, a value for the trigger threshold $P_{th}$ for the closing force is read out from the memory 30 by the first module unit 16. In the exemplary embodiment, the trigger threshold $P_{th}$ has, considered in absolute terms and without compensation, e.g. a constant value for the entire travel path $R_{tot}$ of the component 60, which can be seen in the diagram of FIG. 3 to be explained below. The closing force assigned to the trigger threshold $P_{th}$ varies in absolute values, for which reason the scale of the values for the closing force shown in FIG. 3 is related to the trigger threshold $P_{th}$ for each movement position or is set into a ratio, so that the trigger threshold $P_{th}$ in the illustration of FIG. 3 also assumes a constant value in the case with compensation (lower curve within the travel paths $R_{P1}$ and $R_{P2}$).

During the movement of the component 60, the closing force $P_{act}$ is calculated for a multiplicity of successive movement positions $S_{pos}$. For this purpose, the first module unit continuously reads out values correspondingly measured by the motor voltage sensor 51 and the angular velocity sensor 52 (e.g. a Hall sensor) for the respective current movement position and calculates the current closing force therefrom. A ratio of the current closing force with regard to the closing force of the trigger threshold is then calculated. The current movement position is calculated by the first module unit from information which it receives from the position sensor 53 of the motor unit 50.

The first module unit 16 is now in possession both of the trigger threshold and of the respective current value of the closing force.

At the same time as the signal is received from the central control module 40 for the closing of the roof, the second module unit 18 reads out positions for path sections RP1 and RP2 from the memory 30, which are stored there in advance and define path sections with regard to the component 60 in which the latter may come into pressing contact with seals 91-93 in the opening 70 (boxes 5*a*, 5*b*). For all movement positions calculated by the first module unit 16 (which it then also receives from the latter, box 8), the second module unit now checks in each case whether the movement position currently supplied by the first module unit lies in the respective path section.

Furthermore, the second module unit 18 initiates a second query to the central control module 40 with a request for a system time and receives a second time stamp containing a second system time (box 3). For this purpose, the second module unit 16 reads out the first time stamp from the memory 30 (box 4) and calculates a time difference which corresponds to the opening time of the roof (duration of the uninterrupted release of the opening 70 by the component).

Depending on the above check result (current movement position within the respective path section: Yes), the second module unit 18 now calculates a compensation which is dependent on the time duration of the opened state and with which the normalized current value of the closing force is to be adapted and transmits this value to the first module unit 16, which carries out the adaptation.

In particular, FIG. 3 shows in a diagram a comparison of the currently determined closing force $P_{act}$ (based on the trigger threshold, which assumes a constant value) plotted over the travel path $R_{tot}$ of the component during closing of the opening for the conventional case without compensation for a longer opened state duration of the component and the case according to the invention with compensation for a longer opened state duration of the component within defined travel paths $R_{P1}$ and $R_{P2}$, in which the component may contact and press the seals 91, 92, 93 shown in FIG. 2. Outside the two travel paths, no compensation takes place and the corresponding curves are identical.

In order to explain the concept of the invention, a case of a longer opened state duration of the component is shown in FIG. 3. Within the travel paths $R_{P1}$ and $R_{P2}$, the current value of the closing force $P_{act}$ increases sharply if no compensation is carried out. As can be seen, the respective upper curve exceeds the trigger threshold $P_{th}$ a total of four times (once in the travel path $R_{P1}$ and three times in the travel path $R_{P2}$), which would lead to faulty reversal without compensation.

During the compensation or adaptation, the trigger threshold $P_{th}$ is adapted. In the illustration of FIG. 3, the closing force is related to the trigger threshold $P_{th}$, for which reason the trigger threshold itself in FIG. 3 assumes the same level in the compensated state as in the uncompensated state. In the illustration, by contrast, the closing force $P_{act}$ related to the trigger threshold changes if the trigger threshold $P_{th}$ is adapted. It can be seen clearly in FIG. 3 that, as a result of the compensation, the closing force $P_{act}$ related to the trigger threshold $P_{th}$ decreases to a considerable extent relative to the trigger threshold, with the result that the trigger threshold $P_{th}$ is no longer exceeded and faulty reversal is thereby avoided.

LIST OF REFERENCE SIGNS

1 Device for detecting a pinching situation
10 electronic control unit (ECU)
12 software application
14 pinch protection module
16 first module unit for pinch detection
18 second module unit for compensation accounting for a duration of an opened state
22 incorrect detection
30 memory
50 motor unit
51 motor voltage sensor
52 angular velocity sensor
53 position sensor
54 temperature sensor
60 component
62 additional component
64 gap
70 opening
72 movement of the component
91 first seal
92 second seal
93 third seal

The invention claimed is:

1. A method for detecting a pinching situation when moving an adjustable component for closing an opening by means of an electric motor in a vehicle, comprising the steps:

providing a trigger threshold for at least one of: a closing force, which is exerted by the electric motor on the adjustable component, and a physical variable, on which the closing force is based, with which the electric motor is operated, for at least one movement position of the adjustable component within a travel path available to the component for the movement;

moving the adjustable component into the movement position;

determining a current value of at least one of the closing force and the physical variable on which the closing force is based for the at least one movement position;

comparing the current value and the trigger threshold;

outputting a trigger signal which indicates the pinching situation dependent from a result of the comparison step;

determining a time period over which the adjustable component was continuously held in other movement positions up to a point in time of the movement of the adjustable component into the at least one movement position, wherein in each of the movement positions within the travel path other than the at least one movement position, the opening is not in a state closed by the adjustable component, and adapting at least one of the provided trigger threshold and the determined current value, wherein, when the provided trigger threshold is adapted, the provided trigger threshold is increased, dependent from the determined time period, to generate an adapted trigger threshold, and wherein, when the determined current value is adapted, the determined current value is decreased, dependent from the determined time period, to generate an adapted current value relative to the predefined trigger threshold; and using at least one of: the adapted trigger threshold and the adapted current value in the step of comparing the current value and the trigger threshold, respectively.

2. The method for detecting a pinching situation according to claim 1, further comprising:

reversing the adjustable component dependent from the trigger signal.

3. The method for detecting a pinching situation according to claim 1, wherein the determination of the time period comprises:

querying a first time stamp at which the adjustable component was last moved out of a completely closed position by operating the electric motor;

querying a second time stamp at which the adjustable component reaches or begins to reach the at least one movement position by operating the electric motor during a current closing movement; and calculating the time period from the first time stamp and the second time stamp.

4. The method for detecting a pinching situation according to claim 1, wherein carrying out, if a first time period is determined, at least one of: a first adaptation of the trigger threshold and the current value, which leads to a first difference with respect to the provided trigger threshold, and carrying out, if a second time period is determined which is greater than or lasts longer than the first time period, at least one of: a second adaptation of the trigger threshold and the current value, which leads to a second difference with respect to the provided trigger threshold, wherein the second difference is greater than the first difference.

5. The method for detecting a pinching situation according to claim 1, wherein defining within the travel path available to the adjustable component for the movement a predetermined section of the travel path in which the adjustable component may come into contact with the at least one seal, the at least one seal being provided at or near an opening of the vehicle, which at least one seal is in close contact with the component in the closed state, in order to seal or at least protect a vehicle interior with respect to an outside; and carrying out at least one of: adapting the trigger threshold and adapting the current value depending on whether the at least one movement position of the adjustable component lies within the predetermined section of the travel path.

6. The method for detecting a pinching situation according to claim 1, wherein setting different values for the trigger threshold at different movement positions along the travel path.

7. The method for detecting a pinching situation according to claim 1, wherein calculating at least one of: the adaptation of the trigger threshold and the current value using a formula based on (a) at least one of: the provided trigger threshold and from the determined current value, and (b) a term to be added having a linear dependence on the determined time period.

8. The method for detecting a pinching situation according to claim 1, wherein the adjustable component is a roof of a vehicle selected from any one of a sunroof, a sliding roof, and a glass roof and a opening of the vehicle is configured in the frame of the vehicle that can be closed by the roof of the vehicle.

9. A device for detecting a pinching situation when moving an adjustable component for closing an opening by means of an electric motor in a vehicle, comprising:

first module unit, which is configured to operate the electric motor, to detect a pinching situation in the process and to control the electric motor as a function of the detection in order to reverse the adjustable component, wherein the first module unit is further configured:

to receive a trigger threshold for at least one of a closing force, which is exerted by the electric motor on the adjustable component, and a physical variable, on which the closing force is based, with which the electric motor is operated, for at least one movement position of the adjustable component within a travel path available to it for the movement;

to move the adjustable component into the movement position by operating the electric motor;

to obtain at least one of: a current value of the closing force and the physical variable on which the current value of the closing force is based for the at least one movement position;

to compare the current value and the trigger threshold; and to output a trigger signal which indicates the pinching situation dependent from the result of the step of comparing and with which the closing operation of the adjustable component is switched to its reversing operation;

second module unit, which is configured:

to read in at least one of: a trigger threshold and at least one of: a current value of the closing force and the physical variable on which the current value of the closing force is based for the at least one movement position;

to determine a time period over which the adjustable component was held in other movement positions up to a point in time of the movement of the adjustable component into the movement position, in which the opening was continuously not closed by the adjustable component;

to adapt, to at least one of: to increase the trigger threshold dependent from the determined time period, and to decrease the current value dependent from the determined time period relative to the read-in trigger threshold; and to transmit at least one of: the trigger threshold, which has been adapted, and the current value, which has been adapted, to the first module unit.

10. The method for detecting a pinching situation according to claim 8, wherein the electric motor is a DC motor, in particular a DC motor or a brushless DC (BLDC) motor.

11. The method for detecting a pinching situation according to claim 8, wherein the electric motor is a brushless DC (BLDC) motor.

* * * * *